United States Patent
Coleman et al.

(10) Patent No.: US 7,810,031 B2
(45) Date of Patent: Oct. 5, 2010

(54) EMAIL GENERATION METHOD AND SYSTEM

(75) Inventors: Andrew Coleman, Vestal, NY (US); Gautam Majumdar, Wappingers Falls, NY (US); Muthusamy Palanisamy Muthusamy, Novi, MI (US); Manish Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 11/552,187

(22) Filed: Oct. 24, 2006

(65) Prior Publication Data

US 2008/0098073 A1 Apr. 24, 2008

(51) Int. Cl.
*G06F 17/28* (2006.01)
(52) U.S. Cl. ........................ 715/264; 715/200; 715/234; 715/255; 715/256; 715/271
(58) Field of Classification Search .................. 715/525, 715/264, 256, 255, 200, 234, 271
See application file for complete search history.

(56) References Cited

U.S. PATENT DOCUMENTS

| | | | |
|---|---|---|---|
| 6,948,130 | B2 | 9/2005 | Long et al. |
| 6,957,248 | B2 | 10/2005 | Quine et al. |
| 7,089,286 | B1 | 8/2006 | Malik |
| 2002/0120689 | A1 | 8/2002 | Kang et al. |
| 2004/0205674 | A1* | 10/2004 | Delgado et al. ............. 715/536 |
| 2005/0216377 | A1 | 9/2005 | Trauberg |
| 2005/0262049 | A1* | 11/2005 | Somppi ......................... 707/3 |
| 2006/0075035 | A1* | 4/2006 | Tripp ........................ 709/206 |
| 2007/0016613 | A1* | 1/2007 | Foresti et al. ............ 707/104.1 |
| 2007/0226608 | A1* | 9/2007 | Virk et al. ................... 715/513 |

FOREIGN PATENT DOCUMENTS

CA 2363170 A1 * 5/2003

(Continued)

OTHER PUBLICATIONS http://web.archive.org/web/20041109122337/www.codeproject.com/csharp/mailtemplates.asp.*

(Continued)

*Primary Examiner*—Stephen S Hong
*Assistant Examiner*—Michael Scott
(74) *Attorney, Agent, or Firm*—Schmeiser, Olsen & Watts; William E. Schiesser (57) ABSTRACT

An email generation method and system. The method comprises receiving and storing by a computing system, a first data object. The computing system comprises XML files. Each XML file comprises email templates. The computing system receives language identification data identifying a first XML file of the XML files. The first XML file comprises a first set of email templates. The computing system selects the first XML file in response to receiving the first language identification data. The computing system receives template identification data identifying a first email template of the first set of email templates. The computing system selects the first email template in response to receiving the template identification data. The computing system retrieves the first data object stored in the computing system. The computing system automatically generates a first email by incorporating first portions of the first data object into associated sections of the first email template.

36 Claims, 4 Drawing Sheets

FOREIGN PATENT DOCUMENTS

| | | | | |
|---|---|---|---|---|
| EP | 333612 | A | * | 9/1989 |
| JP | 2005267571 | A | * | 9/2005 |
| WO | WO 0165388 | A1 | * | 9/2001 |
| WO | WO 02088997 | A1 | * | 11/2002 |

OTHER PUBLICATIONS

"Decoding Bounce Messages", Internet Archive http://web.archive.org/web/20011229231943/http://pobox.com/bounce-common.mhtml, Nov. 22, 2001, pp. 1-6.*

* cited by examiner

Email@Company A
09/20/2006 03:30 PM

To  Manish,S / India / Company A
cc
Subject  Your Order is Confirmed

Please do not respond to this notice.It is being sent to you via a service ID

Dear Manish
This is the confirmation mail for your order
Your order number is: 12345678
Your order date is:Sep  12 2006
Thanks If you have any queries please contact our customer support center
Customer Sopport site

EMAIL GENERATION METHOD AND SYSTEM

BACKGROUND OF THE INVENTION

1. Field of the Invention

The present invention relates to a method and associated system for automatically generating an email.

2. Related Art

Producing documents in a computing environment typically comprises a complicated and inefficient process. Accordingly, there exists a need in the art to overcome the deficiencies and limitations described herein above.

SUMMARY OF THE INVENTION

The present invention provides a method comprising:

receiving, by a computing system, a first data object associated with a first user, said computing system comprising a memory device, said memory device comprising a plurality of XML files, each XML file of said plurality of XML files comprising a plurality of email templates, each said plurality of email templates comprising a different language;

storing, by said computing system, said first data object in said memory device;

receiving, by said computing system, first language identification data identifying a first XML file of said plurality of XML files, said first XML file comprising a first plurality of email templates, each email template of said first plurality of email templates comprising a first language;

selecting, by said computing system, said first XML file in response to said receiving said first language identification data;

receiving, by said computing system, template identification data identifying a first email template of said first plurality of email templates from said first XML file, said first email template comprising said first language;

selecting, by said computing system, said first email template in response to said receiving said template identification data;

retrieving, by said computing system, said first data object from said memory device; and automatically generating, by said computing system, a first email, said automatically generating said first email comprising incorporating first portions of said first data object into associated sections of said first email template.

The present invention provides a computing system comprising a processor coupled to a computer-readable memory unit, said memory unit comprising a plurality of XML files and instructions that when executed by the processor implement an email generation method, each XML file of said plurality of XML files comprising a plurality of email templates, each said plurality of email templates comprising a different language, said method comprising:

receiving, by said computing system, a first data object associated with a first user;

storing, by said computing system, said first data object in said memory unit;

receiving, by said computing system, first language identification data identifying a first XML file of said plurality of XML files, said first XML file comprising a first plurality of email templates, each email template of said first plurality of email templates comprising a first language;

selecting, by said computing system, said first XML file in response to said receiving said first language identification data;

receiving, by said computing system, template identification data identifying a first email template of said first plurality of email templates from said first XML file, said first email template comprising said first language;

selecting, by said computing system, said first email template in response to said receiving said template identification data;

retrieving, by said computing system, said first data object from said memory unit; and automatically generating, by said computing system, a first email, said automatically generating said first email comprising incorporating first portions of said first data object into associated sections of said first email template.

The present invention provides a computer program product, comprising a computer usable medium comprising a plurality of XML files and a computer readable program code embodied therein, each XML file of said plurality of XML files comprising a plurality of email templates, each said plurality of email templates comprising a different language, said computer readable program code adapted to implement an email generation method within a computing system, said method comprising:

receiving, by said computing system, a first data object associated with a first user;

storing, by said computing system, said first data object in computer usable medium;

receiving, by said computing system, first language identification data identifying a first XML file of said plurality of XML files, said first XML file comprising a first plurality of email templates, each email template of said first plurality of email templates comprising a first language;

selecting, by said computing system, said first XML file in response to said receiving said first language identification data;

receiving, by said computing system, template identification data identifying a first email template of said first plurality of email templates from said first XML file, said first email template comprising said first language;

selecting, by said computing system, said first email template in response to said receiving said template identification data;

retrieving, by said computing system, said first data object from said computer usable medium; and automatically generating, by said computing system, a first email, said automatically generating said first email comprising incorporating first portions of said first data object into associated sections of said first email template.

The present invention provides a process for integrating computing infrastructure, comprising integrating computer-readable code into a computing system, wherein said computing system comprises a memory unit, wherein said memory unit comprises a plurality of XML files, wherein each XML file of said plurality of XML files comprises a plurality of email templates, wherein each said plurality of email templates comprises a different language, and wherein the code in combination with the computing system is capable of performing an email generation method comprising:

receiving, by said computing system, a first data object associated with a first user;

storing, by said computing system, said first data object in said memory unit;

receiving, by said computing system, first language identification data identifying a first XML file of said plurality of XML files, said first XML file comprising a first plurality of email templates, each email template of said first plurality of email templates comprising a first language;

selecting, by said computing system, said first XML file in response to said receiving said first language identification data;

receiving, by said computing system, template identification data identifying a first email template of said first plurality of email templates from said first XML file, said first email template comprising said first language;

selecting, by said computing system, said first email template in response to said receiving said template identification data;

retrieving, by said computing system, said first data object from said memory unit; and automatically generating, by said computing system, a first email, said automatically generating said first email comprising incorporating first portions of said first data object into associated sections of said first email template.

The present invention advantageously provides a simple method and associated system capable of producing documents in a computing environment.

DETAILED DESCRIPTION OF THE INVENTION

Figure 1:
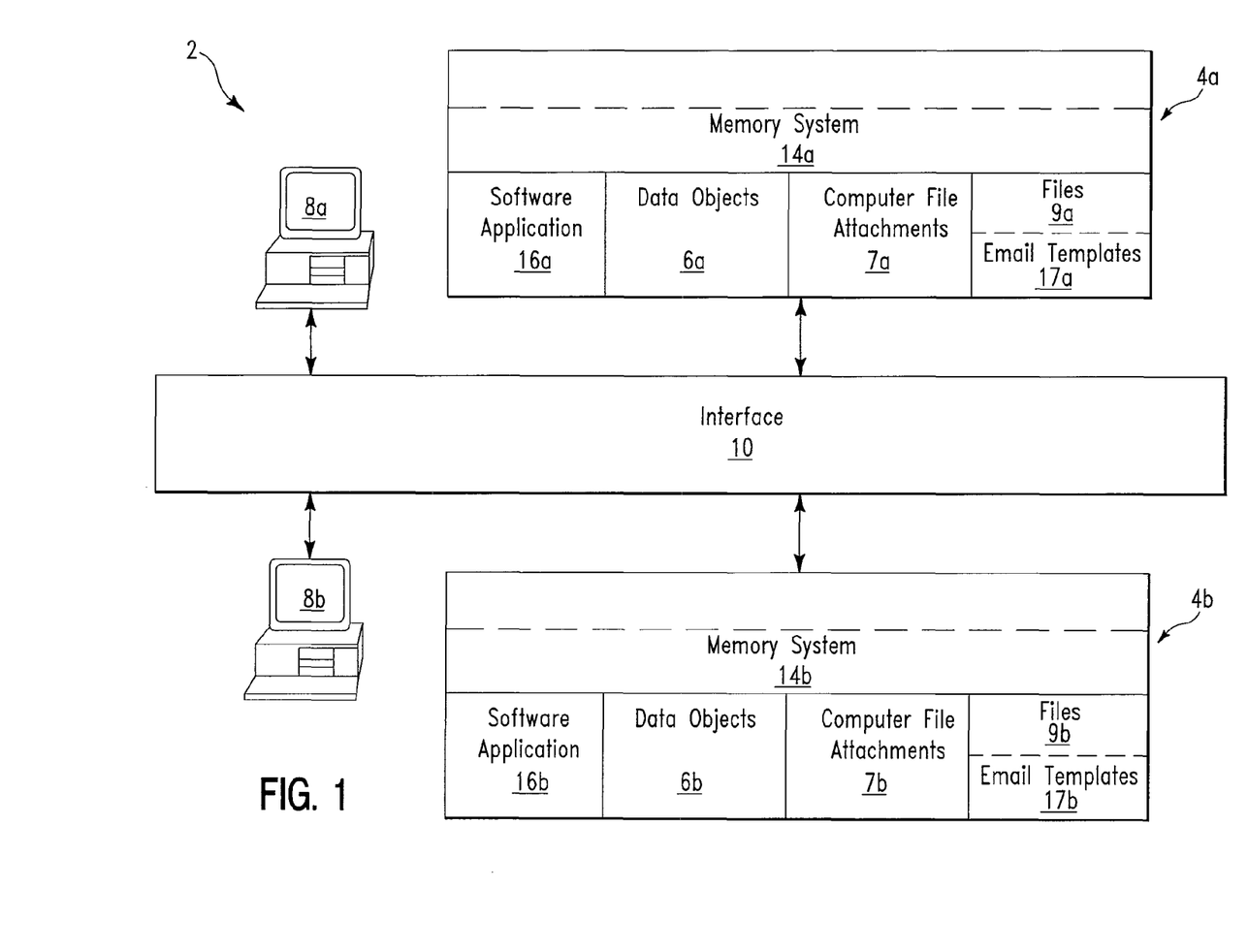
FIG. 1 illustrates a block diagram of a system for automatically generating emails, in accordance with embodiments of the present invention.

FIG. 1 illustrates a block diagram of a system 2 for automatically generating emails, in accordance with embodiments of the present invention. System 2 in the description of FIG. 1 may be used in any business environment for automatically generating emails in response to a function performed by a first user. For example, if the first user completes a purchase or transaction online (i.e., on the Internet), system 2 may be used to automatically generate a purchase order confirmation email for the first user. Alternatively, the generated email may be sent from a first user to a second user. For example, if the first user wishes to send an email (e.g., to request a service) to a second user, system 2 may be used to automatically generate an email for the second user. System 2 automatically generates an email by automatically incorporating portions of data objects (e.g., data object 6a or 6b) into associated sections of an email template (e.g., from email templates 17a or 17b).

System 2 comprises a computing system 4a (e.g., a server or servers), a computing system 4b (e.g., a server or servers), an interface terminal 8a, and an interface terminal 8b all connected through an interface 10. Interface 10 may comprise any type of interface known to a person of ordinary skill in the art including, inter alia, a local area network, (LAN), a wide area network (WAN), the Internet, etc. Computing system 4a comprises a memory system 14a. Memory system 14a comprises data objects 6a, computer file attachments 7a, files 9a (e.g., extensible markup language (XML) files), and a software application 16a. Each of files 9a comprises at a set of email templates from email templates 17a. Each of files 9a may comprise a set of email templates from email templates 17a comprising a different language. Each set of email templates from email templates 17a comprising a different language may comprise a same content (i.e., a same template) with the only difference being language. For example, each of files 9a may comprise an identical set of email templates that are in different languages so that emails may be generated for users in different countries. Memory system 14a or a portion of memory system 14a may be located external to computing system 4a (e.g., an external database). Computing system 4b comprises a memory system 14b. Memory system 14b comprises data objects 6b, computer file attachments 7b, files 9b (e.g., extensible markup language (XML) files), and a software application 16b. Each of files 9b comprises a set of email templates from email templates 17b. Each of files 9b may comprise a set of email templates from email templates 17b comprising a different language. Memory system 14b or a portion of memory system 14b may be located external to computing system 4b (e.g., an external database). Interface terminal 8a enables a first user to interface with computing system 4a.

The following description for using computing system 4a to generate an email is also applicable to computing system 4b. In order to generate an email, computing system 4a receives a first data object (i.e., comprising user related data) associated with a first user (i.e., using terminal 8a). Each file of files 9a comprises a set of email templates. Each set of email templates comprises a different language (e.g., English, French, Spanish, German, etc). Computing system 4a stores the first data object in the memory system. Computing system 4a receives file (language) identification data (e.g., with the first data object) identifying a first associated file (e.g., comprising a specified language) of files 9a. The first file comprises a first set of email templates comprising a first specified language. Computing system 4a selects the first file in response to receiving the first file (language) identification data. Additionally, computing system 4a receives template identification data (e.g., with the first data object) identifying a first email template from the first (XML) file. The first email template comprises the first language. Computing system 4a selects the first email template in response to receiving the template identification data. Computing system 4a automatically generates a first email by incorporating first portions of the first data object into associated sections of said first email template. Additionally, computing system 4a may use additional portions of the data object to generate a computer file attachment. The computer file attachment may be automatically attached to the generated email for transmission to a recipient. Alternatively, computing system 4a may retrieve one of computer file attachments 7a and automatically attach the retrieved computer file attachment to the generated email for transmission to a recipient. The email may be sent back to the first user (e.g., an order confirmation) or to a second user (e.g., using terminal 8b). Additionally, the aforementioned process may be repeated for generating additional emails for additional users in alternative languages.

An example of implementation for using system 2 for automatically generating emails is described as follows:

This example is described with reference to a shopping system (e.g., computing system 4a) with a web-based user interface (e.g., interface terminal 8a) for an online ordering process. A customer uses an input device such as a personal computer (e.g., interface terminal 8a), to browse an online catalog for selecting items to purchase. When the customer finishes shopping online, he/she submits their order. When the shopping system (e.g., computing system 4a) receives the order, an e-mail automatically generated and sent to the customer. The email confirms that the order has been received.

To create the e-mail, the shopping system (e.g., computing system 4a) retrieves different pieces of information that it will send to the customer. In the e-mail, the shopping system will include a total amount of the order and a tentative ship date. The shopping system then passes this information to software application 16a, using a data object. The shopping system then enables software application 16a and passes an identifier(s) (e.g., identification data identifying one of files 9a and an associated email template) indicating which type of e-mail (in a specified language) is to be sent. For this example, the identifier(s) would be an order confirmation identifier. Software application 16a will take the information (i.e., the data objects) and the identifier(s) and build the e-mail. The first step is to use the identifier(s) to locate a correct file comprising a correct email template. Based on the identifier and the user's language preference, software application 16a retrieves the correct file and associated template from template repository (within memory system 14a). Software application 16a then merges dynamic content (i.e., the data object) with the static associated email template and creates a final, formatted e-mail. Before software application 16a sends the e-mail, the e-mail is validated against business rules. For example, there may be a business rule that governs a maximum size of an e-mail that can be sent. If the generated e-mail exceeds that size, it is not sent. Assuming that the e-mail does not violate a business rule, software application 16a sends the e-mail to the customer.

Figure 2:
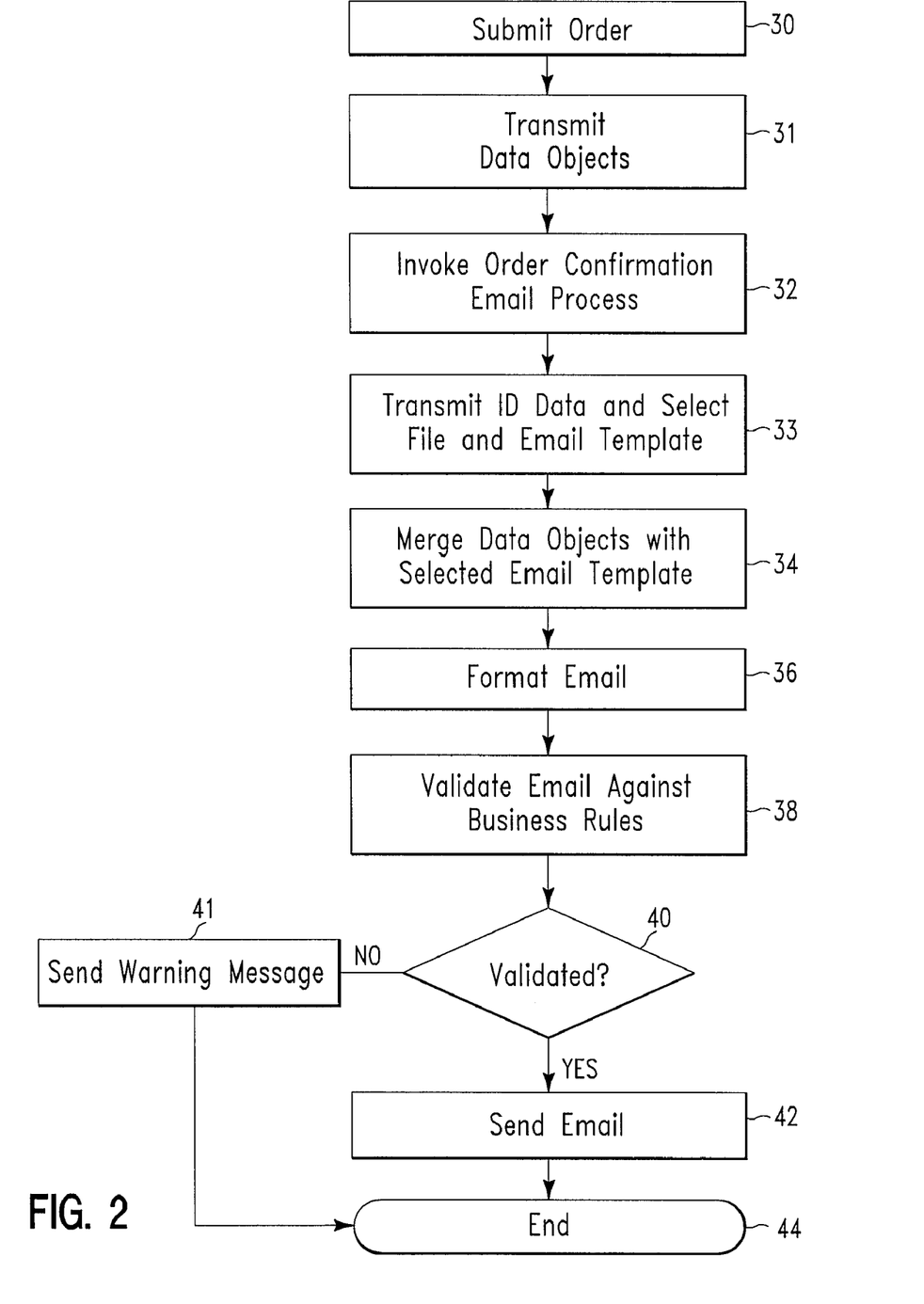
FIG. 2 illustrates a flowchart describing an algorithm used by the system of FIG. 1 for automatically generating emails, in accordance with embodiments of the present invention.

FIG. 2 illustrates a flowchart describing an algorithm used by system 2 of FIG. 1 for automatically generating emails, in accordance with embodiments of the present invention. The flowchart of FIG. 2 is described with reference to an online purchase scenario where computing system 2 is used to automatically generate a purchase order confirmation email for a user purchasing a product online. In step 30, a user submits a purchase order (i.e., the user purchases merchandise online). In step 31, computing system 4a transmits data objects (i.e., customer related data) to computing system 4a. The data objects are the Java objects which will be used to store dynamic values for any email. For each email type, we will have one email data object. Objects of this java class will be created by an order processing system. An example of an email data object is illustrated below:

```
import com.ibm.csa.mail.dataobjects.AbstractBlueMailDO;
import com.ibm.csa.mail.exceptions.MailException;
public class OrderEmailDO extends AbstractBlueMailDO {
    private final static String MAIL_ID = "ORDER_MAIL";
    private String orderNo = null;
    private String orderDate = null;
    private String name = null;
    public OrderEmailDO(String localID) throws MailException {
        super(MAIL_ID, localID);
    }
    public String getName( ) {
        return name;
    }
    public String getOrderDate( ) {
        return orderDate;
    }
    public String getOrderNo( ) {
        return orderNo;
    }
    public void setName(String string) {
        name = string;
    }
    public void setOrderDate(String string) {
        orderDate = string;
    }
    public void setOrderNo(String string) {
        orderNo = string;
    }
}
```

In step 32, an order confirmation process for confirming the order and initiating a confirmation email generation process is enabled. Software application 16a will set the email data object into proper context. A confirmation process example is illustrated below:

```
public static void sendOrderMail(OrderEmailDO orderEmailDO)
    throws MailException {
    SendMail sendMail = new SendMail(orderEmailDO);
    sendMail.putDynamicValue("do", orderEmailDO); //$NON-NLS-1$
    sendMail.send( );
}
```

In step 33, Computing system 4a receives file (language) identification data (e.g., with the first data object) identifying a first associated file (e.g., comprising a specified language) (e.g., of files 9a in FIG. 1). The first file may comprise a first set of email templates comprising a first specified language. Computing system 4a selects the first file in response to receiving the first file (language) identification data. Additionally, computing system 4a receives template identification data (e.g., with the first data object) identifying a first email template from the first file. The first email template comprises the first specified language. Computing system 4a selects the first email template in response to receiving the template identification data. In step 34, data objects (i.e., for the user) are merged with the first email template. The first email template contains one master xml file and many language xml files depending on a number of languages requiring support. The following master template represents an example of a master template.

Master Template

```
<EMAILS>
    <GLOBALPROPERTIES>
        <!-- Mail Server Information -->
        <MAILSERVER>
            <HOSTNAME>Host.companyA.com</HOSTNAME>
        </MAILSERVER>
        <!-- Throttle Properties in MB -->
        <THROTTLE>
            <MAXTOTALSIZE>10</MAXTOTALSIZE>
            <MAXATTACHMENTSIZE>5</MAXATTACHMENTSIZE>
        </THROTTLE>
        <!-- From Address Information -->
        <FROM>
<FROMEMAILADDRESS>csamail@us.companyA.com
</FROMEMAILADDRESS>
            <FROMDISPLAYNAME>CSA Mail</FROMDISPLAYNAME>
        </FROM>
        <!-- Default Values -->
        <DEFAULTS>
            <DEFAULTLANGUAGE>enUS</DEFAULTLANGUAGE>
            <DEFAULTENCODING>UTF-8</DEFAULTENCODING>
        </DEFAULTS>
    </GLOBALPROPERTIES>
    <!-- ORDER MAIL-->
    <EMAIL ID="ORDER_MAIL" type="GROUP" contenttype=
"html" footerneeded="yes" headerneeded="yes"></EMAIL>
    <!-- Language Specific Contents -->
    <LANGCONTENTS LANG="enUS">
        &contents_enUS;
    </LANGCONTENTS>
    <LANGCONTENTS LANG="frCA">
        &contents_frCA;
    </LANGCONTENTS>
</EMAILS>
```

Language template 1 (i.e., for the English language) and language template 2 (i.e., for French) as illustrated, infra, represent example of language templates used by system 2 of FIG. 1.

Language Template 1

```
----------------------------------------<Start>----------------------------------------
<HEADER>
        --------------------------------------------------------------------------------
        <br>
                Please do not respond to this notice. It is being sent via a service ID. <br>
        --------------------------------------------------------------------------------
<br> <br>
    </HEADER>
    <EMAILCONTENTS MAILID="ORDER_MAIL">
        <SUBJECT>Your Order is confirmed</SUBJECT>
        <BODY>
        Dear $do.getName( )<br>
        This is the confirmation mailfor your order <br>
        Your order number is : $do.getOrderNo( ) <br>
        Your order date is : $do.getOrderDate( ) <br>
        Thanks
        </BODY>
    </EMAILCONTENTS>
    <!-- Footer -->
    <FOOTER>
            <br><br>
            If you have any queries please contact our customer support
center<br>
            <a href = "http://www.testcompany/custsupp" > Customer Support
site    <br>
        </FOOTER>
----------------------------------------<End>----------------------------------------
```

Language Template 2

```
----------------------------------------<Start>----------------------------------------
<HEADER>
        --------------------------------------------------------------------------------
<br>
        Veuillez ne pas répondre à cette notification. Elle est envoyée par l'intermédiaire
d'une identification de service. <br>
        --------------------------------------------------------------------------------
<br> <br>
    </HEADER>
    <EMAILCONTENTS MAILID="ORDER_MAIL">
        <SUBJECT> Votre ordre est confirmé </SUBJECT>
        <BODY>
        Cher $do.getName( )<br>
        C'est le mailfor de confirmation votre ordre <br>
        Votre numéro de commande est: $do.getOrderNo( ) <br>
        Votre date d'ordre est: $do.getOrderDate( ) <br>
        Merci
        </BODY>
    </EMAILCONTENTS>
    <!-- Footer -->
    <FOOTER>
        <br><br>
        Si vous avez toutes les questions satisfont le contact notre centre de support
à la clientèle <br>
        <a href = "http://www.testcompany/custsupp" > Emplacement de
support à la clientèle <br>
    </FOOTER>
----------------------------------------<End>----------------------------------------
```

In step 36, the generated email is formatted. The formatting process formats the email in accordance with how the email is configured in the master configuration XML file. The formatting process is used to format a header, a footer, and a body of the email. In step 38, the email is compared to a plurality of business rules to determine if the email may be validated. For example, if a business rule for the email defines a size limitation for the email and/or attachments then the a size of the email is computed and compared to the size limitation to determine if the email is in accordance with the business rule. In step 40, it is determined if the comparison from step 38 results in a validation for the email. If In step 40, it is determined that the comparison from step 38 results in a validation for the email then in step 42 the email is transmitted to a recipient and the process terminates in step 44. If In step 40, it is determined that the comparison from step 38 does not result in a validation for the email then in step 41 a warning message (i.e., indicating that the email has not been validated) may be sent to a sender of the email and the process terminates in step 44.

Figure 3:
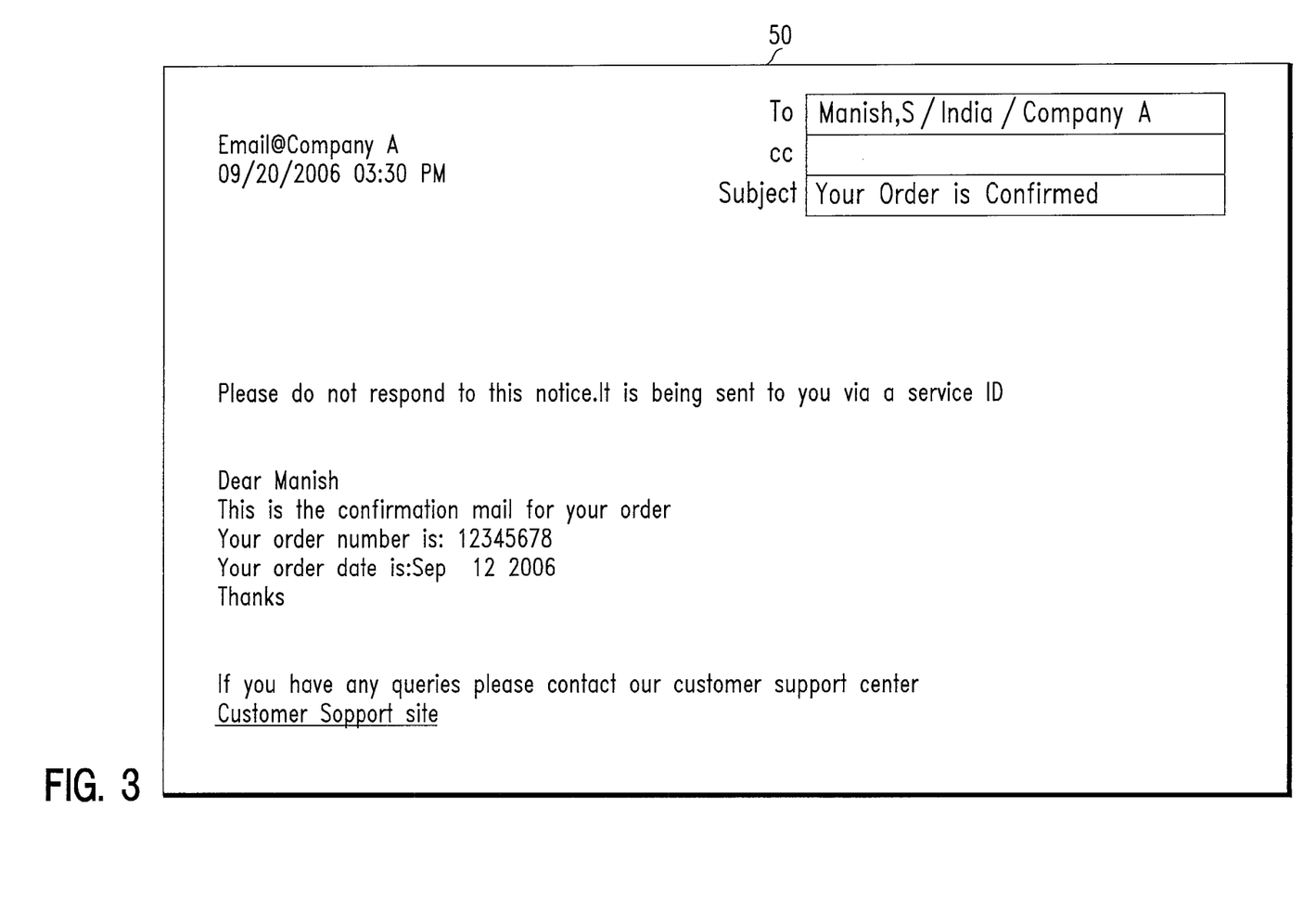
FIG. 3 illustrates an example of an email generated by the system of FIG. 1 and the algorithm of FIG. 2, in accordance with embodiments of the present invention.

FIG. 3 illustrates an example of an email 50 generated by system 2 of FIG. 1 and the algorithm of FIG. 2, in accordance with embodiments of the present invention.

Figure 4:
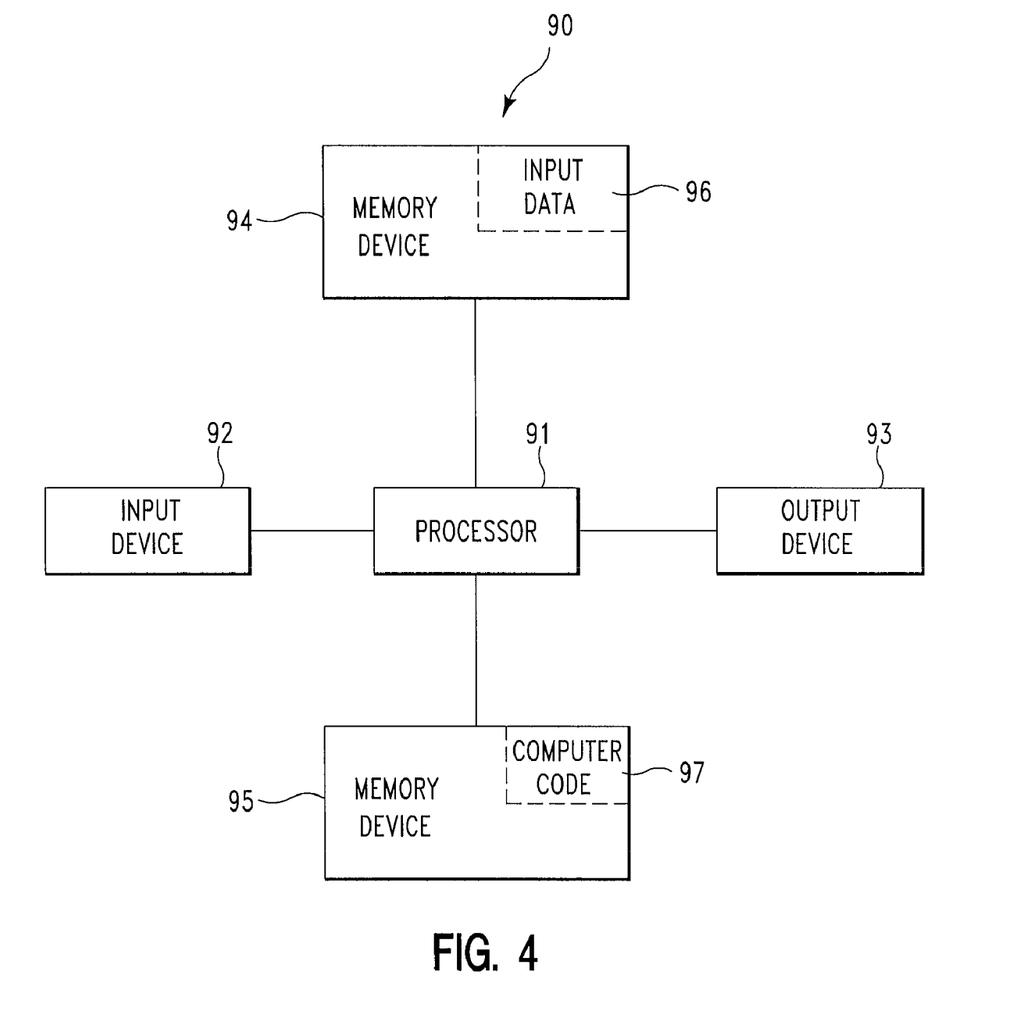
FIG. 4 illustrates a computer apparatus used for automatically generating emails, in accordance with embodiments of the present invention.

FIG. 4 illustrates a computer apparatus 90 (i.e., computing apparatus 4*a* and/or 4*b* in FIG. 1) used for automatically generating emails, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithm of FIG. 2) for automatically generating emails. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to automatically generate emails. Thus the present invention discloses a process for deploying or integrating computing infrastructure, comprising integrating computer-readable code into the computer system 90, wherein the code in combination with the computer system 90 is capable of performing a method for automatically generating emails. In another embodiment, the invention provides a business method that performs the process steps of the invention on a subscription, advertising, and/or fee basis. That is, a service provider, such as a Solution Integrator, could offer to automatically generate emails. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
receiving, by a computing system, a first data object comprising purchase order data related to an online purchase associated with a first user, said first data object received from said first user, said computing system comprising a memory device, said memory device comprising a plurality of XML files and rules data comprising a plurality of business rules, each XML file of said plurality of XML files comprising a master XML file and an associated plurality of email templates, each said plurality of email templates comprising a different language, each said plurality of email templates associated with a purchase order confirmation email;
storing, by said computing system, said first data object in said memory device; receiving, by said computing system, first language identification data identifying a first XML file of said plurality of XML files, said first XML file comprising a first master XML file and a first plurality of email templates, each email template of said first plurality of email templates comprising a first language;
selecting, by said computing system, said first XML file in response to said receiving said first language identification data;
receiving, by said computing system, template identification data identifying a first email template of said first plurality of email templates from said first XML file, said first email template comprising said first language;
selecting, by said computing system, said first email template in response to said receiving said template identification data;
retrieving, by said computing system, said first data object from said memory device;
automatically generating, by a computer processor of said computing system, said first email, said automatically generating said first email comprising incorporating first portions of said first data object into associated sections of said first email template, said first email consisting of a first purchase order confirmation for said online purchase associated with said first user;
automatically generating, by said computing system, an email attachment from additional portions of said first data object;
automatically attaching, by said computing system, said email attachment to said first email:
validating, by said computing system, said first email against said plurality of business rules, wherein one rule of said plurality of rules defines a size limit for said first email; and
formatting, by said computer processor in accordance with said first master XML file, a header, a footer, and a body of said first email.

2. The method of claim 1, wherein said first language identification data is received with said first data object.

3. The method of claim 1, further comprising:
transmitting, by said computing system, said first email to a recipient.

4. The method of claim 3, wherein said recipient is said first user.

5. The method of claim 1, wherein said first data object comprises a Java data object.

6. The method of claim 1, wherein a size of said first email exceeds said size limit, and wherein said method further comprises:
generating, by said computing system, a warning message for warning a sender of said first email that said size limit has been exceeded, said warning message indicating that said first email has not been validated, said warning message independent from said first email; and
transmitting, by said computing system, said warning message to said sender of said first email.

7. The method of claim 1, wherein a size of said first email does not exceed said size limit, and wherein said method further comprises:
transmitting, by said computing system, said first email to a recipient.

8. The method of claim 1, further comprising:
receiving, by said computing system, a second data object associated with a second user,
storing, by said computing system, said second data object in said memory device;
receiving, by said computing system, second language identification data identifying a second XML file of said plurality of XML files, said second XML file comprising a second master XML file and a second plurality of email templates, each email template of said second plurality of email templates comprising a second language, said second language different from said first language;
selecting, by said computing system, said second XML file in response to said receiving said second language identification data;
receiving, by said computing system, second template identification data identifying a second email template of said second plurality of email templates from said second XML file, said second email temple comprising said second language;
selecting, by said computing system, said second email template in response to said receiving said second template identification data;
retrieving, by said computing system, said second data object from said memory device; and
automatically generating, by said computing system, a second email, said automatically generating said second email comprising incorporating portions of said second data object into associated sections of said second email template.

9. The method of claim 8, wherein said first email template comprising said first language and said second email template comprising said second language each comprise a same content.

10. The method of claim 1, wherein said first purchase order confirmation comprises an order number and an order date.

11. A computing system comprising a computer processor coupled to a computer-readable memory unit, said memory unit comprising a plurality of XML files, rules data comprising a plurality of business rules, and instructions that when executed by the processor implement an email generation method, each XML file of said plurality of XML files comprising a master XML file and an associated plurality of email templates, each said plurality of email templates comprising a different language, each said plurality of email templates associated with a purchase order confirmation email, said method comprising:
receiving, by said computing system, a first data object comprising purchase order data related to an online purchase associated with a first user, said first data object received from said first user;
storing, by said computing system, said first data object in said memory unit; receiving, by said computing system, first language identification data identifying a first XML file of said plurality of XML files, said first XML file comprising a first master XML file and a first plurality of email templates, each email template of said first plurality of email templates comprising a first language;
selecting, by said computing system, said first XML file in response to said receiving said first language identification data;
receiving, by said computing system, template identification data identifying a first email template of said first plurality of email templates from said first XML file, said first email template comprising said first language;
selecting, by said computing system, said first email template in response to said receiving said template identification data;
retrieving, by said computing system, said first data object from said memory unit;
automatically generating, by said computer processor, a said first email, said automatically generating said first email comprising incorporating first portions of said first data object into associated sections of said first email template, said first email consisting of a first purchase order confirmation for said online purchase associated with said first user;
automatically generating, by said computing system, an email attachment from additional portions of said first data object;
automatically attaching, by said computing system, said email attachment to said first email;
validating, by said computing system, said first email against said plurality of business rules, wherein one rule of said plurality of rules defines a size limit for said first email; and
formatting, by said computer processor in accordance with said first master XML file, a header, a footer, and a body of said first email.

12. The computing system of claim 11, wherein said first language identification data is received with said first data object.

13. The computing system of claim 11, wherein said method further comprises:
transmitting, by said computing system, said first email to a recipient.

14. The computing system of claim 13, wherein said recipient is said first user.

15. The computing system of claim 11, wherein, said first data object comprises a Java data object.

16. The computing system of claim 11, wherein a size of said first email exceeds said size limit, and wherein said method further comprises:
generating, by said computing system, a warning message for warning a sender of said first email that said size limit has been exceeded, said warning message indicating that said first email has not been validated, said warning message independent from said first email; and
transmitting, by said computing system, said warning message to said sender of said first email.

17. The computing system of claim 11, wherein a size of said first email does not exceed said size limit, and wherein said method further comprises:
transmitting, by said computing system, said first email to a recipient.

18. The computing system of claim 11, wherein said method further comprises:
  receiving, by said computing system, a second data object associated with a second user,
  storing, by said computing system, said second data object in said memory unit; receiving, by said computing system, second language identification data identifying a second XML file of said plurality of XML files, said second XML file comprising a second master XML file and a second plurality of email templates, each email template of said second plurality of email templates comprising a second language, said second language different from said first language;
  selecting, by said computing system, said second XML file in response to said receiving said second language identification data;
  receiving, by said computing system, second template identification data identifying a second email template of said second plurality of email templates from said second XML file, said second email temple comprising said second language;
  selecting, by said computing system, said second email template in response to said receiving said second template identification data;
  retrieving, by said computing system, said second data object from said memory unit; and
  automatically generating, by said computing system, a second email, said automatically generating said second email comprising incorporating portions of said second data object into associated sections of said second email template.

19. The computing system of claim 18, wherein said first email template comprising said first language and said second email template comprising said second language each comprise a same content.

20. A computer program product, comprising a computer readable medium comprising a plurality of XML files, rules data comprising a plurality of business rules, and a computer readable program code embodied therein, each XML file of said plurality of XML files comprising a master XML file and an associated plurality of email templates, each said plurality of email templates comprising a different language, each said plurality of email templates associated with a purchase order confirmation email, said computer readable program code adapted to implement an email generation method within a computing system, said method comprising:
  receiving, by said computing system, a first data object comprising purchase order data related to an online purchase associated with a first user, said first data object received from said first user;
  storing, by said computing system, said first data object in said computer readable medium;
  receiving, by said computing system, first language identification data identifying a first XML file of said plurality of XML files, said first XML file comprising a first master XML file and a first plurality of email templates, each email template of said first plurality of email templates comprising a first language;
  selecting, by said computing system, said first XML file in response to said receiving said first language identification data;
  receiving, by said computing system, template identification data identifying a first email template of said first plurality of email templates from said first XML file, said first email template comprising said first language;
  selecting, by said computing system, said first email template in response to said receiving said template identification data;
  retrieving, by said computing system, said first data object from said computer readable medium;
  automatically generating, by a computer processor of said computing system, said first email, said automatically generating said first email comprising incorporating first portions of said first data object into associated sections of said first email template, said first email consisting of a first purchase order confirmation for said online purchase associated with said first user;
  automatically generating, by said computing system, an email attachment from additional portions of said first data object;
  automatically attaching, by said computing system, said email attachment to said first email;
  validating, by said computing system, said first email against said plurality of business rules, wherein one rule of said plurality of rules defines a size limit for said first email; and
  formatting, by said computer processor in accordance with said first master XML file, a header, a footer, and a body of said first email.

21. The computer program product of claim 20, wherein said first language identification data is received with said first data object.

22. The computer program product of claim 20, wherein said method further comprises:
  transmitting, by said computing system, said first email to a recipient.

23. The computer program product of claim 22, wherein said recipient is said first user.

24. The computer program product of claim 20, wherein said first data object comprises a Java data object.

25. The computer program product of claim 20, wherein a size of said first email exceeds said size limit, and wherein said method further comprises:
  generating, by said computing system, a warning message for warning a sender of said first email that said size limit has been exceeded, said warning message indicating that said first email has not been validated, said warning message independent from said first email; and
  transmitting, by said computing system, said warning message to said sender of said first email.

26. The computer program product of claim 20, wherein a size of said first email does not exceed said size limit, and wherein said method further comprises:
  transmitting, by said computing system, said first email to a recipient.

27. The computer program product of claim 20, wherein said method further comprises:
  receiving, by said computing system, a second data object associated with a second user,
  storing, by said computing system, said second data object in said computer readable medium;
  receiving, by said computing system, second language identification data identifying a second XML file of said plurality of XML files, said second XML file comprising a second master XML file and a second plurality of email templates, each email template of said second plurality of email templates comprising a second language, said second language different from said first language;
  selecting, by said computing system, said second XML file in response to said receiving said second language identification data;

receiving, by said computing system, second template identification data identifying a second email template of said second plurality of email templates from said second XML file, said second email temple comprising said second language;

selecting, by said computing system, said second email template in response to said receiving said second template identification data;

retrieving, by said computing system, said second data object from said computer readable medium; and automatically generating, by said computing system, a second email, said automatically generating said second email comprising incorporating portions of said second data object into associated sections of said second email template.

28. The computer program product of claim 27, wherein said first email template comprising said first language and said second email template comprising said second language each comprise a same content.

29. A process for integrating computing infrastructure, comprising integrating computer-readable code into a computing system, wherein said computing system comprises a memory unit, wherein said memory unit comprises a plurality of XML files and rules data comprising a plurality of business rules, wherein each XML file of said plurality of XML files comprises a master XML file and an associated plurality of email templates, wherein each said plurality of email templates comprises a different language, each said plurality of email templates associated with a purchase order confirmation email, and wherein the code in combination with the computing system is capable of performing an email generation method comprising:

receiving, by said computing system, a first data object comprising purchase order data related to an online purchase associated with a first user, said first data object received from said first user;

storing, by said computing system, said first data object in said memory unit;

receiving, by said computing system, first language identification data identifying a first XML file of said plurality of XML files, said first XML file comprising a first master XML file and a first plurality of email templates, each email template of said first plurality of email templates comprising a first language;

selecting, by said computing system, said first XML file in response to said receiving said first language identification data;

receiving, by said computing system, template identification data identifying a first email template of said first plurality of email templates from said first XML file, said first email template comprising said first language;

selecting, by said computing system, said first email template in response to said receiving said template identification data;

retrieving, by said computing system, said first data object from said memory unit;

automatically generating, by a computer processor of said computing system, said first email, said automatically generating said first email comprising incorporating first portions of said first data object into associated sections of said first email template, said first email consisting of a first purchase order confirmation for said online purchase associated with said first user;

automatically generating, by said computing system, an email attachment from additional portions of said first data object;

automatically attaching, by said computing system, said email attachment to said first email;

validating, by said computing system, said first email against said plurality of business rules, wherein one rule of said plurality of rules defines a size limit for said first email; and formatting, by said computer processor in accordance with said first master XML file, a header, a footer, and a body of said first email.

30. The process of claim 29, wherein said first language identification data is received with said first data object.

31. The process of claim 29, wherein said method further comprises:

transmitting, by said computing system, said first email to a recipient.

32. The process of claim 31, wherein said recipient is said first user.

33. The process of claim 29, wherein said first data object comprises a Java data object.

34. The process of claim 29, wherein a size of said first email exceeds said size limit, and wherein said method further comprises:

generating, by said computing system, a warning message for warning a sender of said first email that said size limit has been exceeded, said warning message indicating that said first email has not been validated, said warning message independent from said first email; and transmitting, by said computing system, said warning message to said sender of said first email.

35. The process of claim 29, wherein a size of said first email does not exceed said size limit, and wherein said method further comprises:

transmitting, by said computing system, said first email to a recipient.

36. The process of claim 29, wherein said method further comprises:

receiving, by said computing system, a second data object associated with a second user, storing, by said computing system, said second data object in said memory unit;

receiving, by said computing system, second language identification data identifying a second XML file of said plurality of XML files, said second XML file comprising a second master XML file and a second plurality of email templates, each email template of said second plurality of email templates comprising a second language, said second language different from said first language;

selecting, by said computing system, said second XML file in response to said receiving said second language identification data;

receiving, by said computing system, second template identification data identifying a second email template of said second plurality of email templates from said second XML file, said second email temple comprising said second language;

selecting, by said computing system, said second email template in response to said receiving said second template identification data;

retrieving, by said computing system, said second data object from said memory unit; and automatically generating, by said computing system, a second email, said automatically generating said second email comprising incorporating portions of said second data object into associated sections of said second email template.

* * * * *